Oct. 24, 1939.   S. FREED   2,177,595
EGG HANDLING DEVICE
Filed Jan. 6, 1937   4 Sheets-Sheet 1

INVENTOR
SAMUEL FREED.
BY
ATTORNEYS.

Oct. 24, 1939.  S. FREED  2,177,595
EGG HANDLING DEVICE
Filed Jan. 6, 1937  4 Sheets-Sheet 2
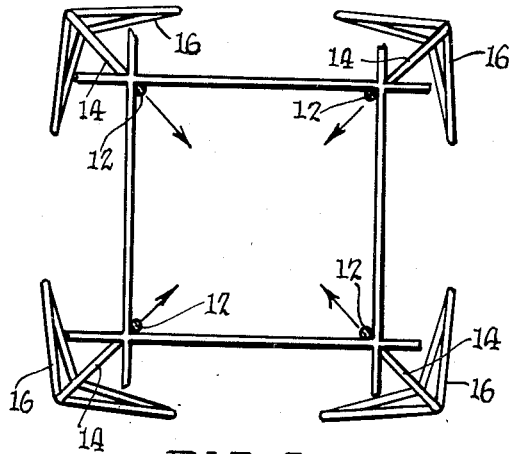
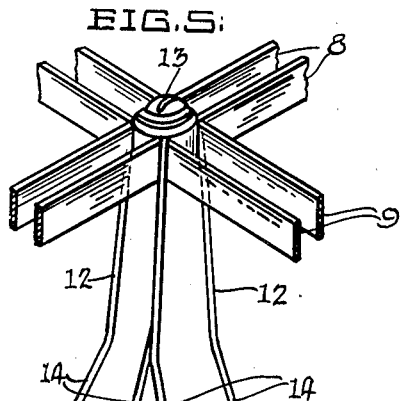
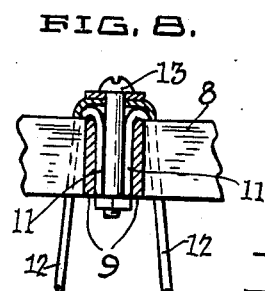
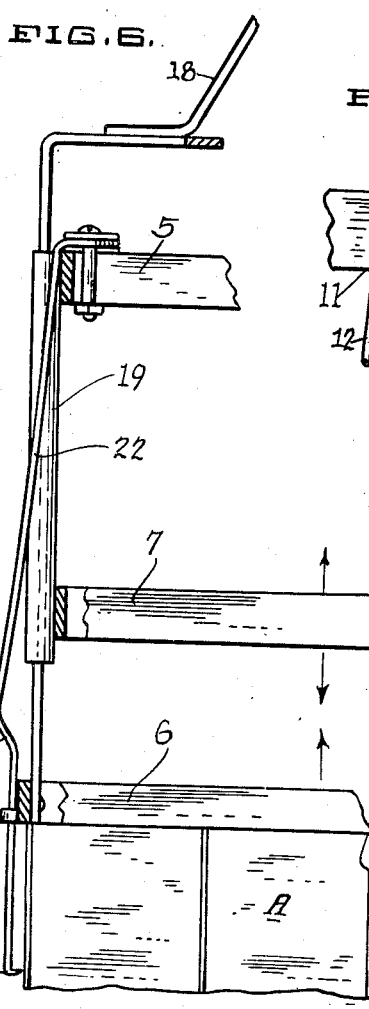
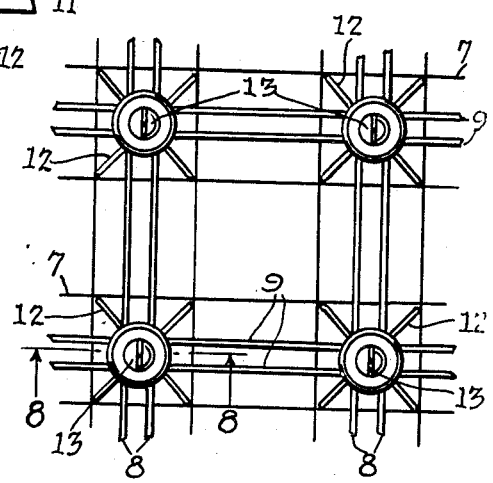
INVENTOR:
SAMUEL FREED.
BY
ATTORNEYS

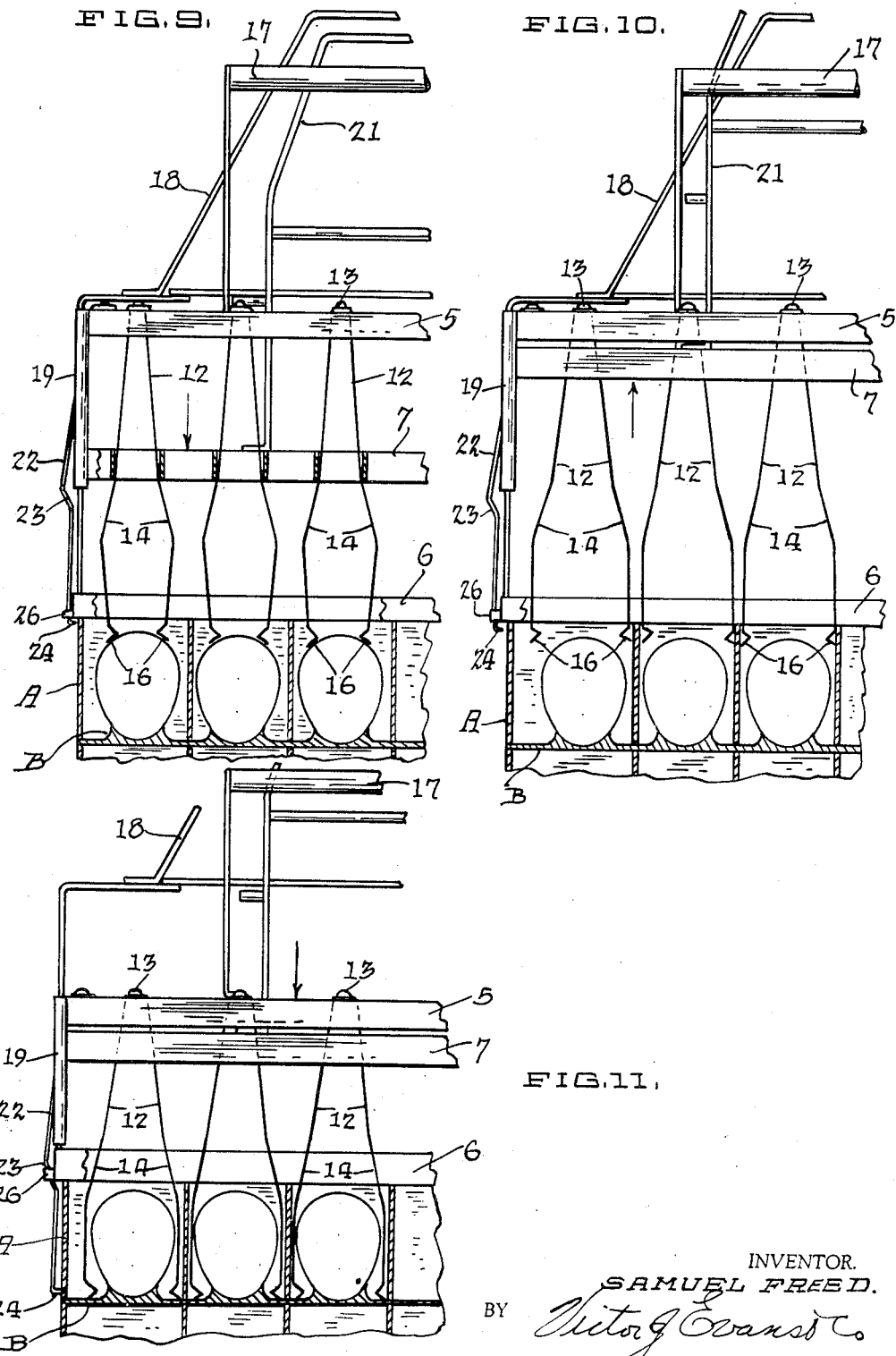

Oct. 24, 1939.   S. FREED   2,177,595
EGG HANDLING DEVICE
Filed Jan. 6. 1937   4 Sheets-Sheet 4
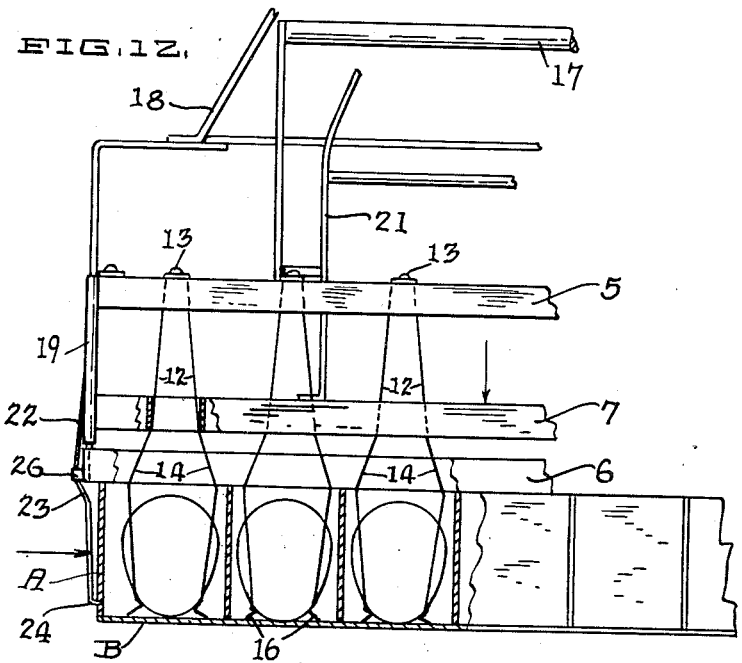
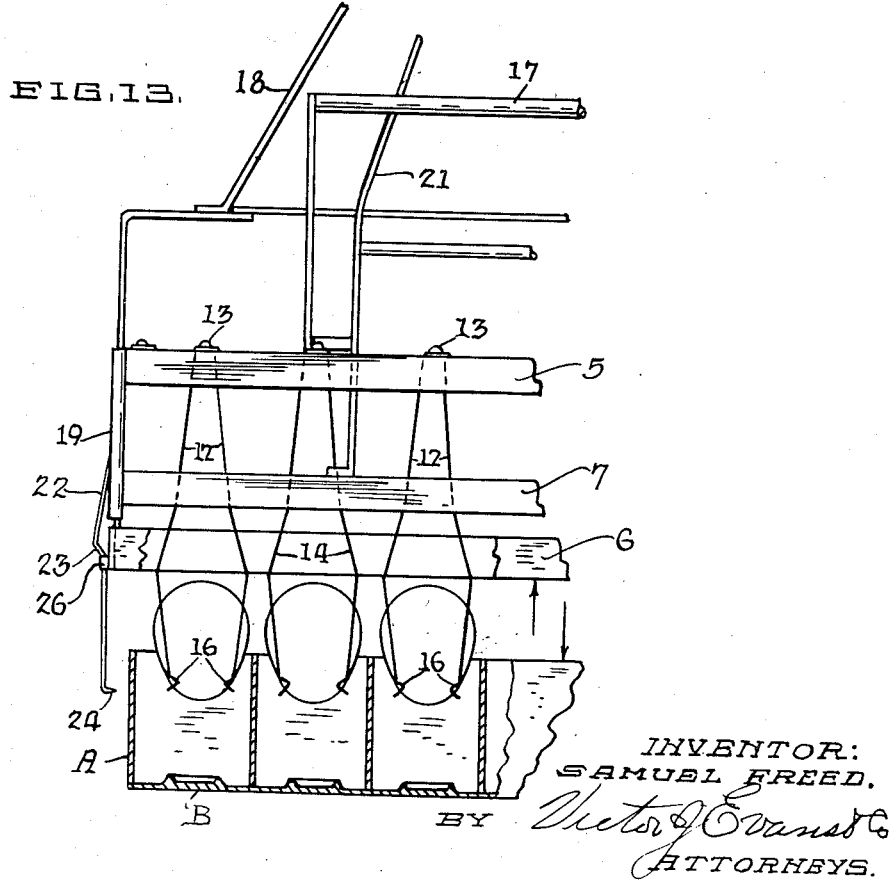
INVENTOR:
SAMUEL FREED.
BY
ATTORNEYS.

Patented Oct. 24, 1939

2,177,595

UNITED STATES PATENT OFFICE 2,177,595

EGG HANDLING DEVICE

Samuel Freed, San Francisco, Calif., assignor to William Marten, San Francisco, Calif.

Application January 6, 1937, Serial No. 119,358

1 Claim. (Cl. 294—87)

This invention relates to improvements in egg handling devices and has particular reference to a device for removing a plurality of eggs from their nested position in their partitioned crate, processing the eggs, and returning the same to partitioned crates.

The principal object of this invention is to provide means for automatically gripping the egg and removing the same without the danger of dropping or breaking, and then replacing the egg after the same has been processed.

A further object is to produce a device of this character which is economical to manufacture, simple to use, and readily transportable from crate to crate, or from place to place.

Other objects and advantages will be apparent during the course of the following description.

In the accompanying drawings forming a part of this specification and in which like numerals are employed to designate like parts throughout the same, Fig. 1 is a side elevation of my device;

Fig. 4 is an enlarged cross sectional view taken on the line 4—4 of Fig. 3;

Fig. 5 is a fragmentary perspective view, showing the manner in which the gripping wires are suspended beneath the carrier frame;

Fig. 6 is a fragmentary detailed view, showing one of the separator engaging hooks;

Fig. 7 is a fragmentary top plan view, showing several units of Fig. 5;

Fig. 8 is a cross sectional view taken on the line 8—8 of Fig. 7;

Fig. 9 is an enlarged detailed view, showing the initial step in removing eggs from a crate;

Fig. 10 is a view similar to Fig. 9, showing the gripping wires spread;

Fig. 11 is a view similar to Fig. 10, showing the gripping wires moved to the bottom of the compartments and spaced from the sides of the eggs;

Fig. 12 is a view similar to Fig. 11, showing the gripping wires engaging the eggs and the separator hook engaging the outer separator strip; and Fig. 13 shows the eggs being lifted from the cells of the crate.

In shipping eggs it is common practice to employ crates in which cells are formed through the medium of cardboard division strips and separator pads. After the eggs have been placed in the crates in the cells thus formed by the separators and division strips, it is often customary to again remove the eggs and process them, which processing usually consists of dipping the eggs into a solution for the purpose of sealing the pores of the eggs, and thus improving their keeping qualities. It is a tedious job to remove each egg by hand, dip it, and replace it; and also there is a large breakage of eggs, which is caused by handling the same.

I have, therefore, devised a machine which will remove a layer of eggs from the cells in a crate, pick up the eggs and the division strips of one layer of the crate, dropping the division strips, but still holding the eggs, after which the same may be immersed in the processing fluid and returned to the cells of another crate, or the same crate, if desired. These eggs are redeposited without being touched by human hands and so gently handled that the danger of breakage is entirely removed. It will be apparent that by handling a whole layer of eggs, it is possible to process a crate of eggs in a comparatively short space of time.

As my device consists of a plurality of like parts, I will describe but one section of my device, capable of handling but one egg, with the understanding that the remaining parts operate in a similar manner.

Figure 1:
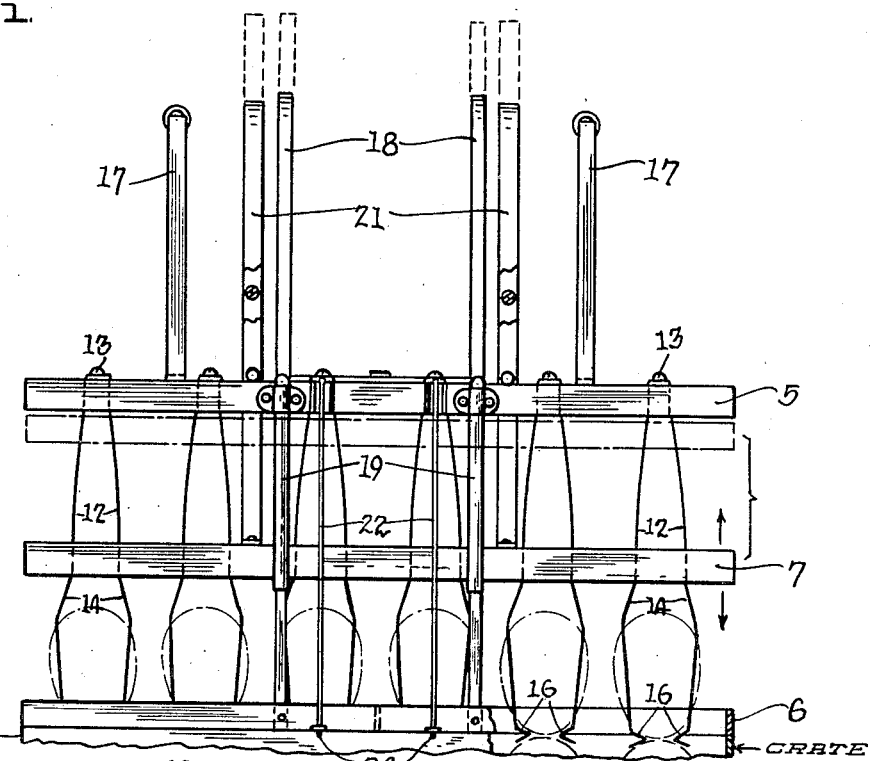
Figure 2:
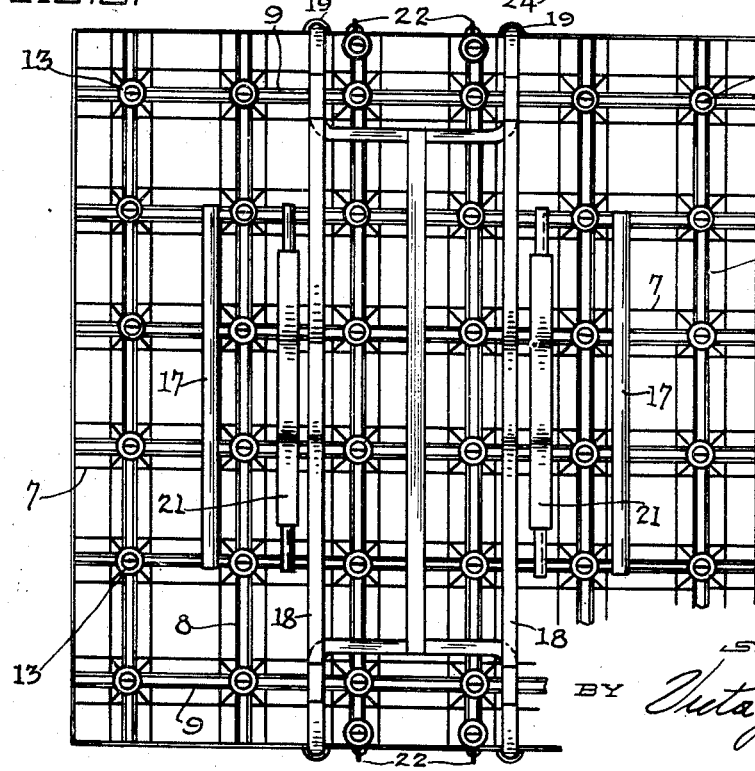
Fig. 2 is a top plan view of Fig. 1.
Figure 3:
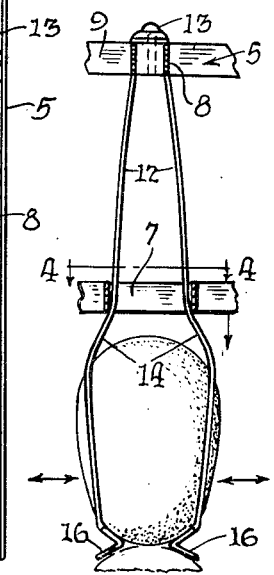
Fig. 3 is a fragmentary detailed view, showing one of the grippers engaging an egg.

In the accompanying drawings wherein for the purpose of illustration is shown a preferred embodiment of my invention and referring to Fig. 1, it will be noted that I have provided a carrier frame 5, a supporting or stripping frame 6, and an actuator frame 7. The carrier frame 5 is provided with a plurality of parallel cross pieces 8 and 9, crossing each other at right angles so as to form rectangular openings into which the inturned ends 11 of gripper wires 12 are positioned and held by a bolt and nut, as shown at 13. Each of these gripper wires is offset so as to form a cam section 14 substantially midway of its length and has its lower end bent in irregular form so as to provide grippers 16. The carrier frame 5 is provided with a pair of handles 17, the purpose of which will be later seen. The supporting frame 6 is provided with handles 18 which extend upwardly through tubular guides 19 secured to the carrier frame 5. Therefore, the supporting frame 6 has a sliding connection with the carrier frame 5. The actuator frame 7 is so constructed that it consists of a plurality of square openings sliding over the gripper wires 12. This frame is provided with handles 21. Secured to the carrier frame 5 and on opposite sides of the device are spring wires 22, provided with a cam section 23 and inturned ends 24. The lower end of these wires pass through a guide 26 upon the supporting frame 6.

The operation of my device is as follows:—

We will assume that the parts are in the position of Fig. 9 and that the crate has been removed, in order to simplify the drawings. Therefore, the supporting frame will rest upon the customary cardboard division strips A, which division strips in turn rest upon separator pads B. There may be a number of layers within the crate, that being immaterial, as my device will pick up successively layers from the top to the bottom of the crate with equal facility.

Assuming that it is now desired to operate the device and that the supporting frame is resting upon the cardboard division strips, the first move is to adjust the actuator frame to the position of Fig. 9 by pushing downwardly on the handles 21. This causes the frame 7 to act upon the cam surfaces 14 of the gripper wires and center the same over each egg and free from the division strips.

The second operation is to move the handles 21 upwardly so that the actuator frame underlies the carrier frame 5. This act allows the gripper wires 12 to expand into contact with the sides of the cells formed by the division strips.

The next operation is shown in Fig. 11, wherein the carrier frame 5, the actuator frame 7, and the gripper wires 12 are moved downwardly with respect to the supporting frame 6. This positions the lower ends of the gripping wires in the bottom of the cells adjacent the bottom of the eggs and in close proximity to the pads B. The upward movement of the carrier frame 6 causes the spring wire 22 to pass its cam surface 23, through the guide 26; and, consequently, the pointed end 24 will engage the outer surface of the division strip. By now pushing down upon the handles 21, the actuator frame 7 will again engage the cam surfaces of the wires 12 and cause the same to move against the egg, gripping the same. The entire device together with the division strips forming the particular layer may now be removed from the crate, and after so doing, the division strips or cells may be dropped by moving the supporting frame 6 downwardly away from the actuator frame 7. This will release the cell structure, as indicated in Fig. 13, as the ends 24 will be withdrawn through the cam action in the wire 22. The eggs in the device may now be processed and then returned to the cell structure; and as soon as deposited therein, the same may be released by merely pulling upwardly on the handles 21, which will open the egg grippers and release the eggs.

It will be apparent from the above description that through the simple manipulation of the three handles upon the device, the eggs may be quickly and safely lifted from their position in the cells, processed, and returned to the cells in a most expeditious manner.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

In an egg handling device, a supporting frame, a carrier frame slidably mounted on said supporting frame, an actuator frame slidably mounted on said carrier frame, handles attached to each frame, whereby each of said frames may be independently moved with respect to the remaining of said frames, and a plurality of gripping elements secured to said carrier frame and extending downwardly through said actuator frame, each of said gripping elements having camming sections contacted by said actuator frame, whereby the free ends of said gripping elements may be moved through the movement of said actuator frame, said gripping elements including looped spring wire sections having inwardly and outwardly bent egg gripping sections forming substantially diamond-shaped end portions.

SAMUEL FREED.